US010578437B2

(12) United States Patent
Taurel et al.

(10) Patent No.: US 10,578,437 B2
(45) Date of Patent: Mar. 3, 2020

(54) DISPLACEMENT SENSOR WITH SEGMENTED RING MICRORESONATOR

(71) Applicant: COMMISSARIAT A L'ENERGIE ATOMIQUE ET AUX ENERGIES ALTERNATIVES, Paris (FR)

(72) Inventors: Boris Taurel, Montbonnot-Saint-Martin (FR); Salim Boutami, Grenoble (FR); Laurent Duraffourg, Voiron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/026,535

(22) Filed: Jul. 3, 2018

(65) Prior Publication Data

US 2019/0011261 A1 Jan. 10, 2019

(30) Foreign Application Priority Data

Jul. 4, 2017 (FR) ..................................... 17 56293

(51) Int. Cl.
*G01C 19/72* (2006.01)
*G02B 6/293* (2006.01)

(52) U.S. Cl.
CPC ....... *G01C 19/727* (2013.01); *G02B 6/29338* (2013.01)

(58) Field of Classification Search
CPC .............. G01C 19/727; G01D 5/35338; G02B 6/29338; G02B 6/29341
See application file for complete search history.

(56) References Cited

U.S. PATENT DOCUMENTS

2002/0039470 A1* 4/2002 Braun ................ G02B 6/12002 385/50
2009/0220184 A1* 9/2009 Goldring ................ B82Y 20/00 385/2

(Continued)

FOREIGN PATENT DOCUMENTS

FR 3 054 664 A1 2/2018

OTHER PUBLICATIONS

V Sauer, V. T. K., et al. "Optical racetrack resonator transduction of nanomechanical cantilevers." Nanotechnology 25.5 (2014): 055202 (Year: 2014).*

(Continued)

*Primary Examiner* — Dominic J Bologna
(74) *Attorney, Agent, or Firm* — Oblon, McClelland, Maier & Neustadt, L.L.P.

(57) ABSTRACT

An optical sensor includes an optical device including a microresonator, laid out to guide a light beam along a closed loop optical path, and an injection and/or extraction waveguide, optically coupled to the microresonator; a photodetector, arranged at the output of the injection and/or extraction waveguide; and an analysis device, receiving a signal supplied by the photodetector, and deducing therefrom information relative to a displacement. The microresonator is constituted of a plurality of elementary waveguides spaced apart from each other, and arranged one after the other according to a loop shaped layout. The optical sensor offers increased sensitivity to the measurement of nanometric displacements.

15 Claims, 6 Drawing Sheets

(56) References Cited

U.S. PATENT DOCUMENTS

| | | | | |
|---|---|---|---|---|
| 2015/0123017 | A1* | 5/2015 | Yu | G02B 6/12007 250/503.1 |
| 2015/0168441 | A1* | 6/2015 | Hutchison | G01P 15/093 356/460 |
| 2016/0069687 | A1* | 3/2016 | Ciminelli | G01C 19/721 356/461 |
| 2017/0146738 | A1* | 5/2017 | Xu | G02B 6/1225 |
| 2018/0039024 | A1 | 2/2018 | Boutami et al. | |

OTHER PUBLICATIONS

Siddharth Tallur, Suresh Sridaran, and Sunil A. Bhave, "A monolithic radiation-pressure driven, low phase noise silicon nitride opto-mechanical oscillator," Opt. Express 19, 24522-24529 (2011) (Year: 2011).*

U.S. Appl. No. 15/660,251, filed Jul. 26, 2017, 2018/0039024 A1, Salim Boutami et al.

U.S. Appl. No. 15/279,955, filed Sep. 29, 2016, 2017/0097301 A1, Anthony Lefebvre et al.

U.S. Appl. No. 13/702,790, filed Feb. 20, 2013, 2013/0144542 A1, Thomas Ernst et al.

U.S. Appl. No. 14/519,390, filed Oct. 21, 2014, 2015/0107357 A1, Sébastien Hentz et al.

U.S. Appl. No. 15/245,472, filed Aug. 24, 2016, 2017/0059499 A1, Laurent Duraffourg.

U.S. Appl. No. 15/274,153, filed Sep. 23, 2016, 2017/0089944 A1, Laurent Duraffourg.

U.S. Appl. No. 15/867,215, filed Jan. 10, 2018, Unknown.

U.S. Appl. No. 15/978,481, filed May 14, 2018, Unknown.

French Preliminary Search Report dated Feb. 9, 2018 in French Application 17 56293 filed on Jul. 4, 2017 (with English Translation of Categories of Cited Documents).

Sauer, VTK, et al., "Optical racetrack resonator transduction of nanomechanical cantilevers", Nanotechnology, vol. 25, 2014, pp. 12.

Tallur, S. et al., "A monolithic radiation-pressure driven, low phase noise silicon nitride opto-mechanical oscillator", Optics Express, vol. 19, No. 24.,2011, pp. 8.

Dong, B. et al., "An on-chip opto-mechanical accelerometer", Micro Electro Mechanical Systems (MEMS), 2013, IEEE 26th International Conference on, IEEE, Jan. 20, 2013, pp. 4.

* cited by examiner

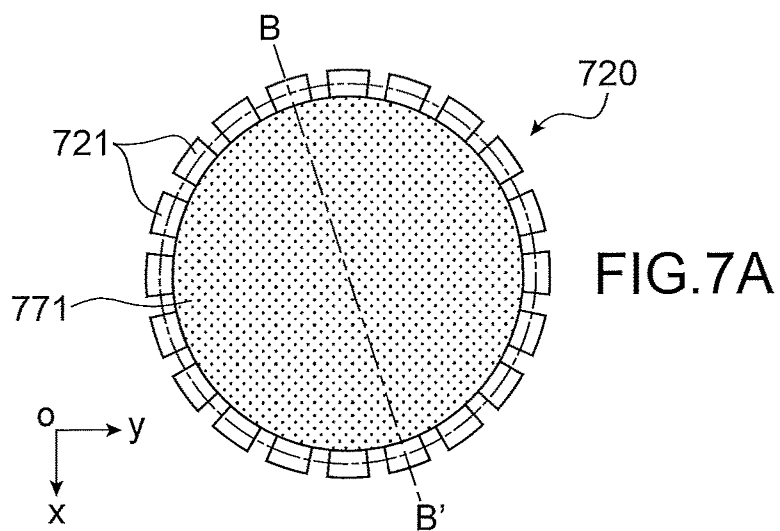
FIG.7A
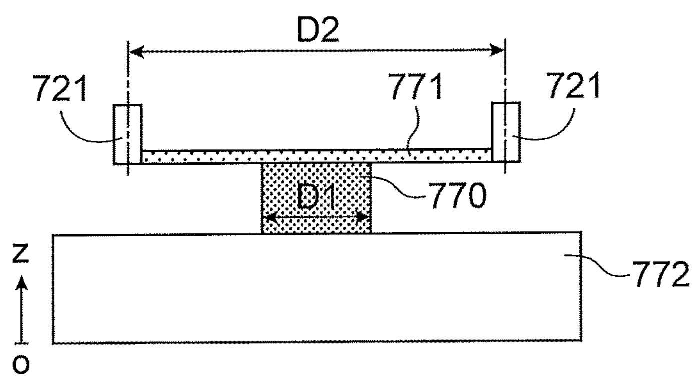
FIG.7B
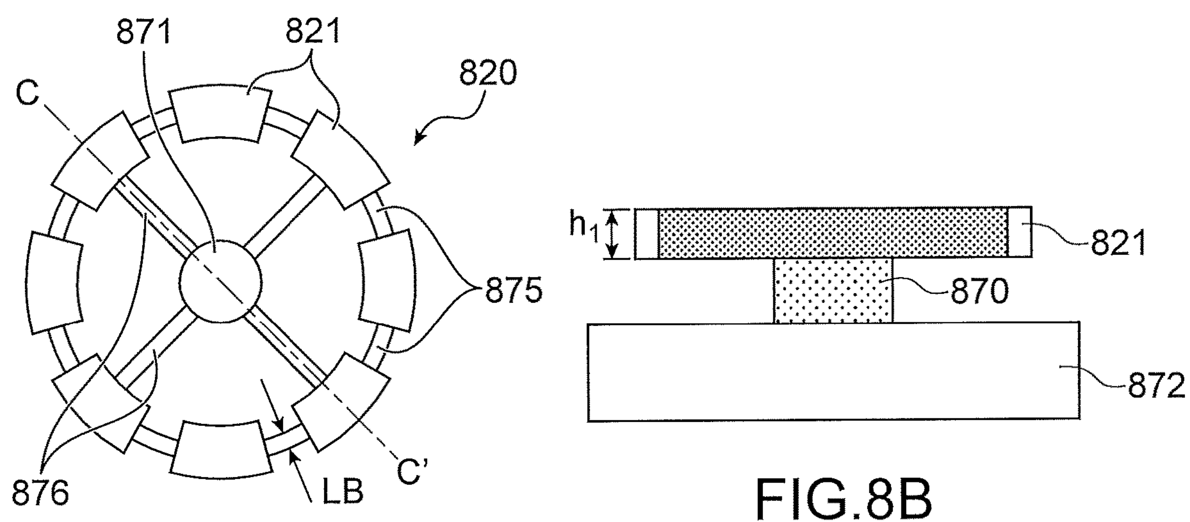
FIG.8A
FIG.8B

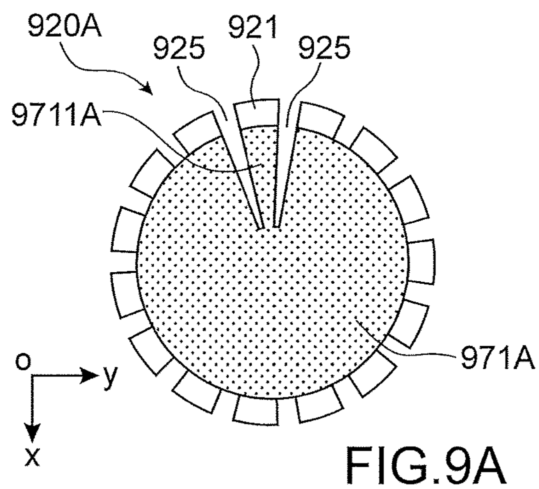
FIG.9A
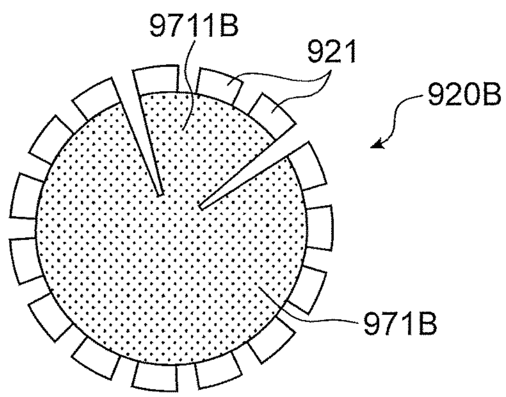
FIG.9B
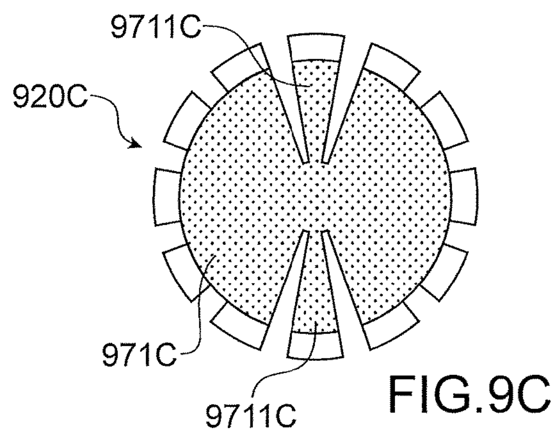
FIG.9C
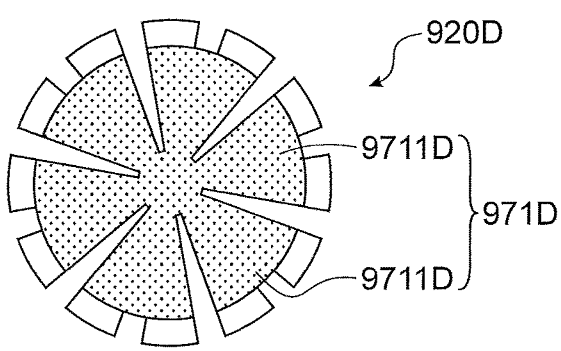
FIG.9D
FIG.10A
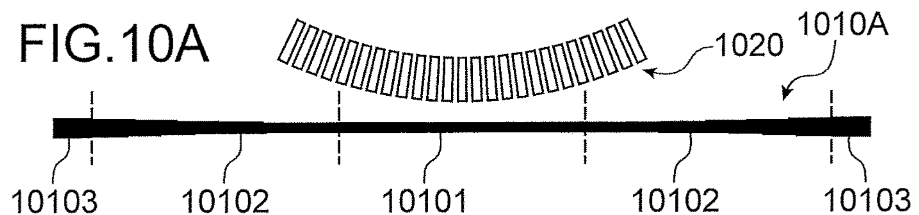
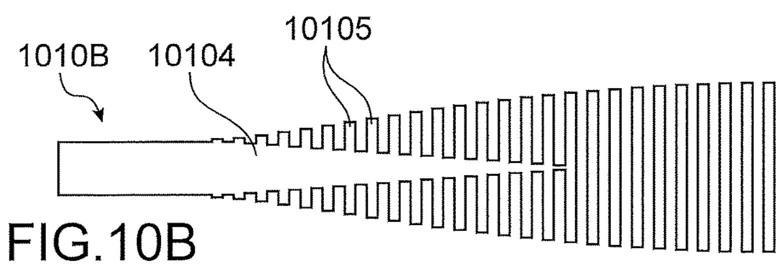
FIG.10B

DISPLACEMENT SENSOR WITH SEGMENTED RING MICRORESONATOR

TECHNICAL FIELD

The invention relates to the field of waveguide microresonators, and their use for detecting, or even measuring, a deformation of the microresonator or a displacement in the near field of said microresonator.

PRIOR ART

The article "Optical racetrack resonator transduction of nanomechanical cantilevers", by V. T. K. Sauer & al., Nanotechnology, vol. 25 (2014), describes the measurement of the displacement of a nanobeam, near to a waveguide microresonator.

The waveguide microresonator is constituted of a ring shaped curved waveguide, called ring microresonator.

The ring microresonator does not comprise cladding. It is the surrounding medium that acts as cladding.

This microresonator is coupled to an injection and extraction waveguide, by evanescent coupling.

Evanescent coupling corresponds to an interaction between a guided mode of the injection and extraction waveguide, and a guided mode of the microresonator, which results in a transfer of energy between these two modes.

This energy transfer is maximal at the resonance wavelengths of the microresonator. A resonance wavelength of the microresonator is a wavelength for which the phase shift brought by a turn in the ring is a multiple of $2\pi$.

In operation, a light beam, designated analysis beam, is sent to the input of the injection and extraction waveguide. A part of the analysis laser beam escapes towards the microresonator, where it performs one or more turns before returning to the injection and extraction waveguide.

The part of the analysis beam transiting in the microresonator undergoes optical losses therein, due notably to absorption by the surrounding medium.

A nanobeam, moveable, is arranged in the near field of the microresonator. It moves closer to or moves further away from the microresonator, as a function of external conditions.

The position of the nanobeam defines locally the composition of a cladding for the microresonator. This position thus influences the value of the effective index $N_{eff}$ of the guided mode in the microresonator, and consequently the values of resonance wavelength A.

These quantities, effective index $N_{eff}$ and resonance wavelengths $\lambda$, are indeed linked together. For a circular optical path of radius R in the microresonator, the following equation notably applies:

$$\lambda = \frac{N_{eff} * 2\pi R}{m} \quad (1)$$

with m an integer greater than or equal to one.

The analysis of a variation in the light, at the output of the injection and extraction waveguide, thus makes it possible to detect and measure a variation in the position of the nanobeam relative to the ring microresonator.

The influence of the nanobeam on the resonance wavelengths remains however quite restricted, which limits the sensitivity of the sensor.

One objective of the present invention is to propose an optical sensor comprising a waveguide microresonator, offering improved sensitivity to the detection of a displacement in the near field of said microresonator.

DESCRIPTION OF THE INVENTION

This objective is attained with an optical sensor comprising:

- an optical device, which includes:
  - a waveguide microresonator, laid out to guide a light beam along a closed loop optical path; and
  - an injection and extraction waveguide, or an injection waveguide and an extraction waveguide, optically coupled to the microresonator for the injection and the extraction of said light beam;
- a photodetector, arranged at the output of the injection and extraction waveguide, respectively at the output of the extraction waveguide; and
- an analysis device, receiving at the input a signal supplied by the photodetector, configured to compare said signal with reference data, and to deduce therefrom information relative to a displacement within the optical device.

According to the invention, the microresonator is constituted of a plurality of elementary waveguides, spaced apart from each other, and arranged one after the other according to a loop shaped layout. The term "loop" here designates any curved line that closes on itself, preferably without crossing, for example a circle (or ring, considering the entire volume occupied by the elementary waveguides), a triangle with rounded angles, a rectangle with rounded angles, two half-circles joined by two parallel segments, etc.

Thus, an ancillary moveable element such as a nanobeam can move near to the microresonator, up to being located between two elementary waveguides.

When the ancillary moveable element is located between two elementary waveguides, it cuts the optical path of the light beam propagating in the microresonator, which results in a considerable increase in the losses at the resonance wavelengths of the microresonator and/or a considerable modification of the phase in the microresonator.

Thus, a displacement of the moveable element between two positions, one situated between two elementary waveguides of the microresonator, and the other not, results in a considerable variation in the light at the output of the injection and extraction waveguide (respectively at the output of the extraction waveguide).

The sensitivity to the detection of this displacement is thus greatly increased, in comparison with the prior art where only the evanescent part of a wave circulating in the microresonator is sensitive to said displacement.

The layout of the microresonator, composed of elementary waveguides spaced apart from each other, has other advantages some of which are detailed hereafter.

A waveguide microresonator can, notably when it is laid out suspended, contract and extend radially. This movement is called "respiration of the microresonator".

The article "A monolithic radiation-pressure driven, low phase noise silicon nitride opto-mechanical oscillator", by Siddharth Tallur & al., Optics Express, Vol. 19, No. 24, describes a ring microresonator according to the prior art, as well as the radial contraction and extension movements thereof.

Said movement modifies the curvilinear length of the microresonator, which results in a modification of its resonance wavelengths.

With a microresonator according to the invention, said movement also modifies the interstitial length between two neighbouring elementary waveguides, and thus the effective index of a guided mode in the microresonator.

Yet, the resonance length is also a function of this effective index. Compared to the prior art, the variation in resonance wavelength is thus higher, for a same amplitude of radial movement.

The sensitivity of detection, or even of measurement, of the mechanical deformation of the microresonator is thereby increased.

Since the microresonator is constituted of distinct elementary waveguides, it is possible to free the movement of some of them, relative to the others.

Mechanical stresses, which in the prior art were not capable of deforming the microresonator, can then lead to the displacement of one or more elementary waveguides relative to the others. This displacement results in a variation in a signal having transited via the microresonator. The sensitivity of the microresonator to external mechanical stresses is thereby increased.

The displacement within the optical device, mentioned above, designates in particular a deformation of the microresonator itself, and/or the displacement of a moveable element relative to the microresonator.

The analysis device may notably be configured to compare a wavelength spectrum, supplied by the photodetector at a current instant t1, and a reference spectrum.

The reference spectrum may be a wavelength spectrum, supplied by the photodetector at an instant t0 preceding the instant t1.

The comparison of spectra, which is then implemented by the analysis device, may comprise a comparison of intensity values, in local minima of these spectra, and/or a comparison of wavelength values, associated with these local minima.

The invention is based on the interaction between a mechanical displacement and an optical phenomenon of resonance. The optical sensor according to the invention thus forms an opto-mechanical sensor, with improved sensitivity. The improvement is linked to an intensified opto-mechanical coupling between the mechanical displacement and the optical phenomenon of resonance, or in other words between a mechanical oscillator and an optical oscillator.

The optical sensor according to the invention offers increased sensitivity to the measurement of nanometric displacements.

The optical device including the microresonator is described in detail, and protected as such, in the patent application FR 16 57222, filed on the 27 Jul. 2016. This patent application, however, does not describe an optical sensor comprising an analysis device such as described above, and does not identify the advantages specific to the use of said optical device to obtain information relative to a displacement.

BRIEF DESCRIPTION OF THE DRAWINGS

The present invention will be better understood on reading the description of exemplary embodiments given for purely illustrative purposes and in no way limiting, and by referring to the appended drawings in which:

FIGS. 7A and 7B illustrate in a schematic manner a first alternative of suspended layout of the microresonator according to the invention;

FIGS. 8A and 8B illustrate in a schematic manner a second alternative of suspended layout of the microresonator according to the invention;

FIGS. 9A to 9D illustrate different alternatives of the microresonator of a third embodiment of an optical sensor according to the invention;

FIGS. 10A and 10B illustrate two alternatives of a coupling zone of an injection and extraction waveguide according to the invention.

DETAILED DESCRIPTION OF PARTICULAR EMBODIMENTS

Figure 1A:
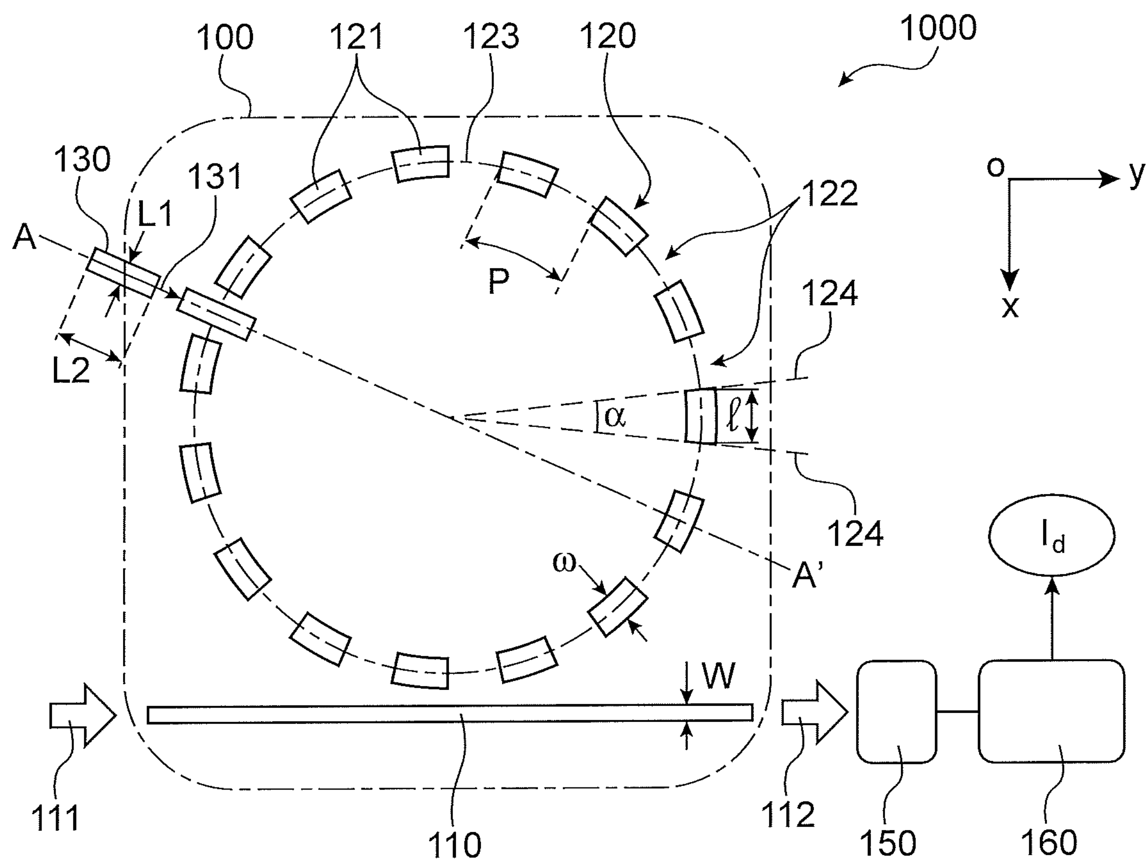
FIGS. 1A and 1B illustrate in a schematic manner a first embodiment of an optical sensor according to the invention, respectively in a top view and in a sectional view.
Figure 1B:
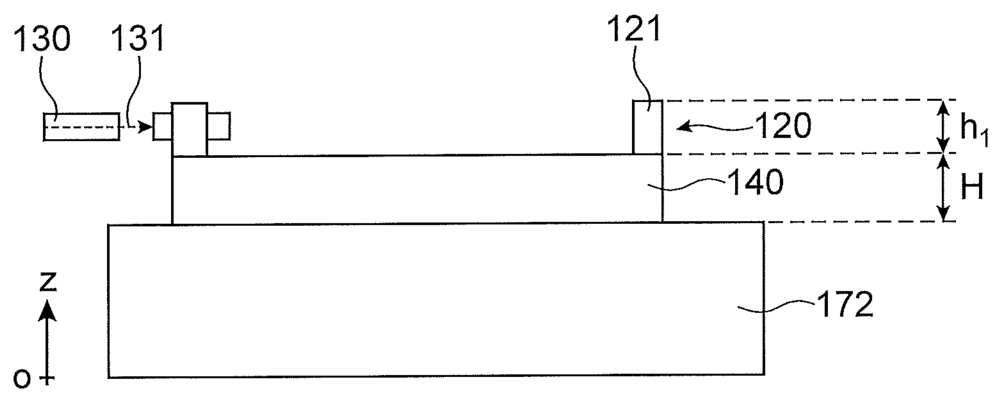

FIGS. 1A and 1B illustrate a first embodiment of an optical device 100 and an optical sensor 1000 according to the invention, respectively in a top view, in the plane (xOy) of an orthonormal coordinate system, and in a sectional view, in the plane (yOz) of the same coordinate system. In FIG. 1A, the section plane AA' corresponding to FIG. 1B is represented.

The optical device 100 includes:

- an injection and extraction waveguide 110, configured to guide a light beam designated analysis beam; and
- a waveguide microresonator 120, configured to guide at least one portion of the analysis beam along a closed loop optical path 123.

According to the invention, the waveguide microresonator 120 is constituted of a plurality of waveguide sections, designated elementary waveguides 121.

The elementary waveguides 121 define together the optical path 123 travelled by the light in the microresonator, here a circular optical path 123 (represented in dotted lines in FIG. 1A). In other words, they are laid out one after the other according to a ring shaped layout.

The several elementary waveguides are spaced apart from each other. In other words, the input of an elementary waveguide is not in direct physical contact with the output of a neighbouring elementary waveguide. The elementary waveguides are separated two by two by a respective free space 122.

Each of the elementary waveguides 121 is without cladding, such that in operation a surrounding medium around the microresonator 120 acts as cladding.

Each elementary waveguide 121 is advantageously constituted of a same and single material (or alloy). This material is the same for all the elementary waveguides 121.

The elementary waveguides are advantageously made of silicon or silicon nitride.

They are for example made of silicon, to guide a light beam in the infrared (wavelength greater than 1 μm, in particular comprised between 1 μm and 10 μm).

In an alternative, the elementary waveguides 121 are made of nitride, in particular silicon nitride ($Si_3N_4$), to guide a light beam in the visible (wavelength strictly less than 1 μm, in particular comprised between 0.4 μm and 0.8 μm).

It may be considered that the microresonator 120 forms a segmented ring microresonator, that is to say a microresonator as described in the introduction, in which only some sections of the curved waveguide are kept, and form the elementary waveguides.

The microresonator 120 is arranged near to the injection and extraction waveguide 110.

At the level of the microresonator 120, the injection and extraction waveguide 110 extends along a straight line, parallel to a tangent to the microresonator.

The injection and extraction waveguide 110 extends outside of the microresonator 120, without necessarily direct physical contact therewith.

Hereafter, an example in which the injection and extraction waveguide 110 is spaced apart from the microresonator 120 is illustrated, but in a non-limiting manner.

Preferably, the injection and extraction waveguide 110 is constituted, like the elementary waveguides 121, of a single material (or alloy), the surrounding medium acting as cladding. This single material is advantageously the same as that constituting the elementary waveguides.

In the example described with reference to FIGS. 1A and 1B, the injection and extraction waveguide is advantageously laid out non-suspended, mechanically stable relative to the microresonator.

The microresonator 120 and the injection and extraction waveguide 110 are optically coupled to each other by evanescent coupling.

In operation, the injection and extraction waveguide 110 receives at the input a light beam 111 designated analysis beam.

At least one part of the analysis beam is transferred into the microresonator 120, by evanescent coupling. This part of the analysis beam is a signal at a resonance wavelength of the microresonator 120. It may be all or part of the analysis beam.

A resonance wavelength of the microresonator is a wavelength for which the phase shift brought by a turn in the microresonator is a multiple of $2\pi$.

This part of the analysis beam, transferred from the injection and extraction waveguide 110 to the microresonator 120, makes several turns in the microresonator 120 before returning into the same injection and extraction waveguide 110.

Not all of the light returns into the injection and extraction waveguide 110, due to losses during propagation in the microresonator 120. These losses can even be 100%.

As represented in FIG. 1B, all the elementary waveguides 121, of thickness $h_1$, are arranged here on a same plane support 140, of thickness H.

The thicknesses H and $h_1$ are measured along the axis (Oz), orthogonal to the plane of the microresonator.

In FIG. 1B, but in a non-limiting manner, the thickness H is greater than or equal to the thickness $h_1$.

The plane support 140 extends under the set of elementary waveguides 121, between said elementary waveguides 121 and a substrate 172.

The plane support 140 is in direct physical contact, on one side with each of the elementary waveguides 121, and on the other side with said substrate 172.

Thus, the microresonator 120 is not suspended above said substrate 172. In other words, the bearing points of an elementary waveguide 121 on the substrate 172 are aligned with said elementary waveguide, along the axis (Oz). Put another way, the elementary waveguides 121 are bearing on the substrate 172, without lever arm.

The elementary waveguides are thus mechanically stable, relative to each other, and relative to the substrate 172.

Numerous alternatives of a layout of the microresonator 120 not suspended above the substrate 172 may be implemented, for example without the intermediate plane support 140.

According to the first embodiment of the invention, the optical device 100 further includes an ancillary moveable element 130, being able to move relative to the microresonator 120, preferably according to an oscillation movement.

In FIG. 1B are represented elementary waveguides 121 of reduced width, for a better illustration of the ancillary moveable element 130. Nevertheless, the elementary waveguides 121 are preferably wider than high (dimension along (Oz)).

The moveable layout of the element 130 may be achieved by a suspended fixation, with one end of the element 130 that may be left free.

The ancillary moveable element 130 is situated in the near field of the microresonator, spaced apart from the latter by a distance less than several hundreds of nanometres, for example below 600 nm and even below 300 nm.

One at least of the dimensions of the ancillary moveable element is less than 0.5 μm, preferably between 10 nm and 300 nm.

The ancillary moveable element 130 is here a nanobeam, of width L1 comprised between 100 nm and 200 nm, and of length L2 equal to around 1 μm.

Here, the thickness of the nanobeam 130 (along the axis (Oz)) is less than that of the elementary waveguides 121, without this example being limiting.

The nanobeam is moveable between two extreme positions. In FIGS. 1A and 1B, the nanobeam 130 is represented twice, in each of these two extreme positions.

The path 131 followed by the nanobeam, between these two extreme positions, is represented by an arrow in dotted lines.

The path 131 extends here in a plane parallel to the plane of the microresonator 120. It defines here a radius of the microresonator 120.

Throughout the text, the plane of the microresonator is a plane receiving the upper faces of the elementary waveguides 121, parallel to the plane (Oxy).

In a first of said extreme positions, the nanobeam 130 is oriented towards the centre of the microresonator, but situated entirely outside of it.

In this case, optical losses in the microresonator remain limited. The nanobeam only interacts with the evanescent part of the beam circulating in the microresonator, as in the prior art.

In the other of said extreme positions, the nanobeam 130 has been translated along the path 131, and extends in part within a free space 122, between two neighbouring elementary waveguides 121.

Thus it cuts the path of the light beam in the microresonator 120, which causes considerable optical losses (by optical leaks in the nanobeam, by reflections, diffraction, or even perturbation of a condition on the pitch of the elementary waveguides which can cancel a guiding condition, etc.).

The optical losses increase with a level of occupancy, by the nanobeam, of a free space 122 between two elementary waveguides.

The nanobeam can move according to an oscillation movement, during which it enters and exits a free space 122, between two neighbouring elementary waveguides 121.

By monitoring the evolution over time of the spectrum of the light beam 112 at the output of the injection and extraction waveguide 110 it is possible to detect, with good sensitivity, a nanometric displacement of the nanobeam relative to the microresonator 120 (for example a displacement less than 20 nm).

According to the invention, the optical device 100 forms part of an optical sensor 1000 further comprising:

- a photodetector 150, arranged at the output of the injection and extraction waveguide 110, on the side opposite to an end for input of the analysis beam 111 in the injection and extraction waveguide 110; and
- an analysis device 160, connected to the photodetector 150.

The photodetector 150 includes at least one photodiode. It may further include spectral dispersion means such as a prism or a grating, or a simple filter, to spread out the different spectral components of a wide spectrum beam onto the different photodiodes of a strip of photodiodes.

It is laid out at one of the ends of the injection and extraction waveguide, to receive the beam 112 emerging from the injection and extraction waveguide 110, and resulting from the coupling between the microresonator 120 and the injection and extraction waveguide 110.

The analysis device 160 includes electronic and/or computer means, notably a processor.

It receives at the input a signal supplied by the photodetector 150.

This signal is advantageously, but in a non-limiting manner, in the form of a wavelength spectrum of the beam 112 emerging from the injection and extraction waveguide 110.

The analysis device 160 comprises in particular an electronic or computer comparator, for comparing the signal supplied by the photodetector 150 with reference data, and deducing therefrom information $I_d$ relative to a displacement within the optical device 100.

The information $I_d$ is supplied at the output of the analysis device 160.

Here, the analysis device 160 implements in particular a comparison between a first wavelength spectrum, supplied by the photodetector 150 at an initial instant to, and a second wavelength spectrum, supplied by the photodetector 150 at an instant t1 later than t0. The wavelength spectrum, supplied at the initial instant t0, then forms the reference data.

Figure 2:
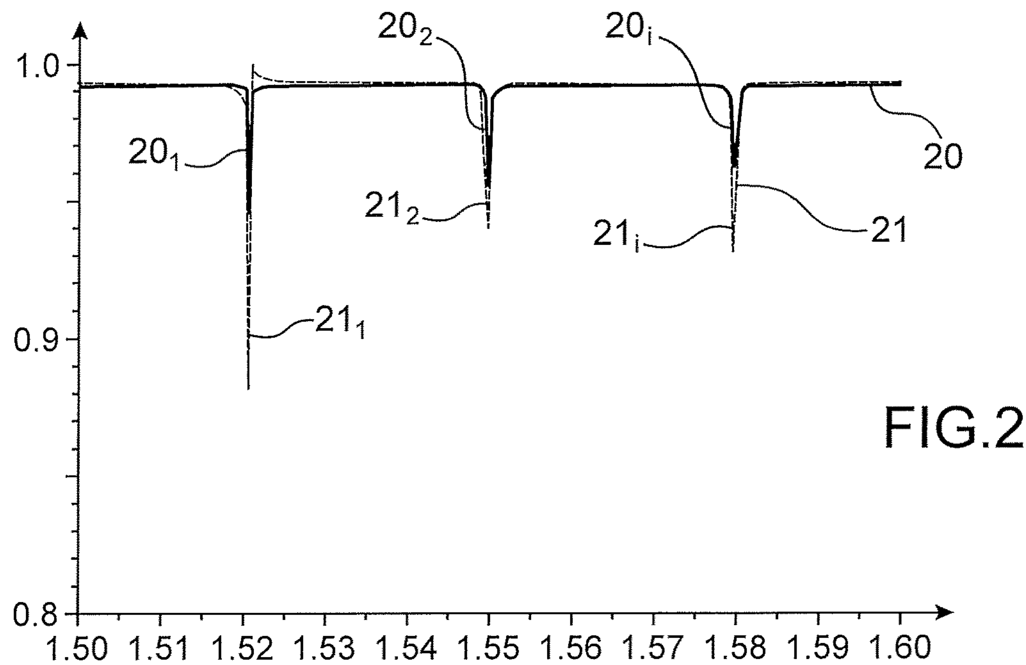
FIG. 2 illustrates transmission spectra obtained by means of the sensor of FIGS. 1A and 1B.

FIG. 2 illustrates:

- the wavelength spectrum 20 (solid line), supplied by the photodetector 150 at an initial instant t0, when the nanobeam 130 is located outside of a free space between two neighbouring elementary waveguides 121; and
- the wavelength spectrum 21 (dotted line), supplied by the photodetector 150 at the instant t1, when the nanobeam 130 traverses such a free space.

The x-axis is a wavelength, in µm. The y-axis is a transmission rate from one end to the other of the injection and extraction waveguide 110.

The microresonator 120 is constituted of 500 elementary guides 121 made of silicon, immersed in air. The distribution pitch of the elementary guides 121 is 40 nm. They are distributed according to a ring of median radius equal to 5 µm. The injection and extraction waveguide has a section of 500 nm by 220 nm. The interstice between the injection and extraction waveguide 110 and the microresonator 120 is 300 nm. The nanobeam is a rectangular parallelepiped of dimensions 1000 nm×220 nm×30 nm.

The spectra 20 and 21 each correspond to the analysis beam, less the losses in the microresonator 120. These losses are localised at the resonance wavelengths of the microresonator 120. These losses form transmission minima $\mathbf{20}_1$, $\mathbf{20}_2$ . . . $\mathbf{20}_i$, respectively $\mathbf{21}_1$, $\mathbf{21}_2$ . . . $\mathbf{21}_i$, on the spectra 20, respectively 21.

As expected, the losses are much higher when the nanobeam 130 cuts the optical path of the beam transiting in the microresonator. In particular, the transmission rate at the smallest resonance wavelength is decreased by around 8%, when the nanobeam 130 cuts the optical path of the beam transiting in the microresonator.

Thus, the evolution over time of the spectrum of the signal at the output of the injection and extraction waveguide makes it possible to detect with very good sensitivity that the nanobeam enters or exits a free space between two neighbouring elementary waveguides.

It involves in particular, here, monitoring the evolution as a function of time of the intensity values at the level of the transmission minima.

The information, $I_d$, relative to a displacement within the optical device 100, may be constituted of the simple detection of a displacement greater than a predetermined threshold.

According to an advantageous alternative, the analysis device 160 uses the result of the comparison, here a comparison of spectra, to calculate the value of this displacement (in length units).

The information, $I_d$, then comprises this value of displacement.

The calculations implemented to calculate this displacement will not be described further here, and will not present any difficult per se for those skilled in the art, specialists in the use of microresonators for measuring a displacement.

Each displacement may be considered as a sum of two displacements, a first displacement where the nanobeam remains entirely outside of the microresonator, and a second displacement where the nanobeam crosses a greater and greater portion of a free space between two elementary waveguides.

The first displacement may revert to calculations implemented in the prior art. The second displacement involves original calculations, based on simulations or on a theoretical model of the microresonator.

Numerous alternatives may be implemented, without going beyond the scope of the invention.

Figure 3:
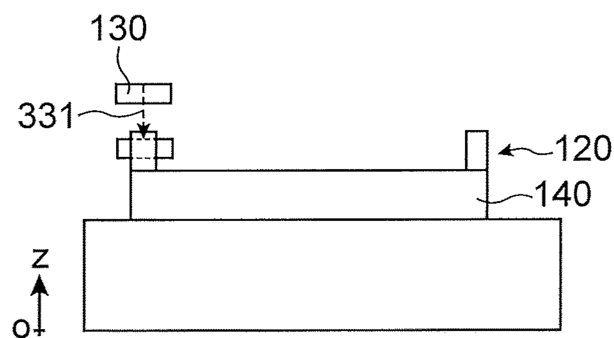
FIG. 3 illustrates in a schematic manner a first alternative of the embodiment of FIGS. 1A and 1B.

For example, the nanobeam 130 can move along a vertical path 331, orthogonal to the plane of the microresonator 120, as illustrated in FIG. 3. Here again, the width of the elementary waveguides is not representative, the latter being preferably wider than high.

Other paths may combine components along (Oz) and along (Oxy).

According to an alternative not represented, the ancillary moveable element is a membrane.

According to another alternative, the injection and extraction waveguide 110 is replaced by an injection waveguide 110A, for injecting the analysis beam 111 into the microresonator, and an extraction waveguide 110B distinct from the injection waveguide, to receive what remains of the analysis beam after transit in the microresonator 120.

Figure 4:
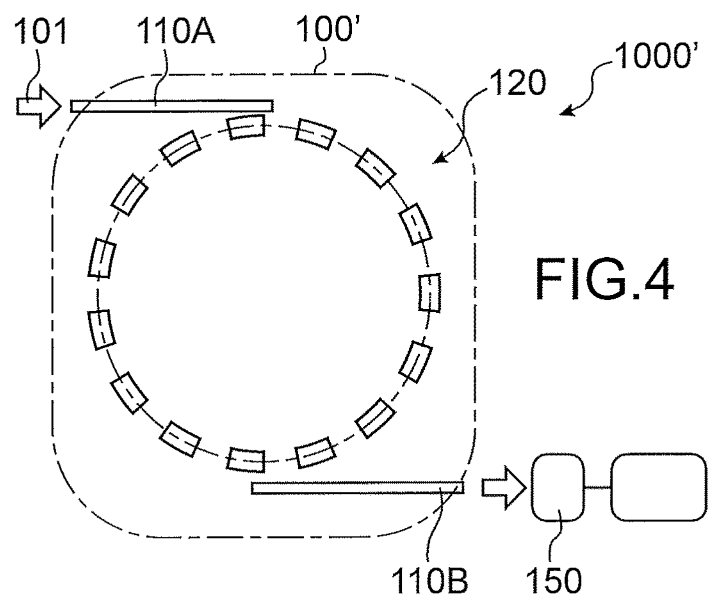
FIG. 4 illustrates in a schematic manner a second alternative of the embodiment of FIGS. 1A and 1B.

This alternative is illustrated by the optical device 100' and the optical sensor 1000' of FIG. 4. In FIG. 4, the nanobeam is not represented.

In this case, the analysis beam 111 may be a monochromatic beam, at a resonance wavelength of the microresonator 120, and the photodetector 150 may be constituted of a simple photodiode, sensitive to this wavelength.

Thus, the signal supplied by the photodetector 150, to the analysis device 160, is not a spectrum but a single light intensity value.

The comparison implemented within the analysis device is next a comparison between an intensity value measured at the instant t1, and a reference value. Said reference value may be constituted by an intensity value measured at an instant t0, preceding the instant t1.

This alternative has the advantage that the photodetector 150 only receives the wavelength affected by a displacement. It thus offers increased sensitivity to said displacement, providing that the resonance wavelength is known, and little affected by the displacement.

According to another alternative, the optical device according to the invention does not comprise an ancillary moveable element, and the displacement of the injection and extraction waveguide, respectively the injection waveguide and/or the extraction waveguide, is detected. Said waveguide is then advantageously laid out suspended, bearing on at least two pillars.

According to another alternative, the optical device according to the invention comprises on the contrary several ancillary moveable elements such as nanobeams. These several elements move together, and have together a greater influence on the signal variations at the output of the injection and extraction waveguide. The sensitivity to a load causing these displacements is thereby increased.

According to another alternative, the microresonator is laid out suspended, but its vibration modes are not very likely to modify the signal transiting in the microresonator.

In each of the alternatives of the invention, the reference data are advantageously data previously measured by the photodetector 150. They may also be data previously calculated, obtained in an entirely theoretical manner, or from experimental measurements compiled during a preliminary calibration step.

The optical device according to the invention may be placed inside a hermetic cavity placed under vacuum. It may also be placed within a cryostat, to limit thermal Brownian motion noise. It is however, preferably, subjected to atmospheric pressure.

The optical sensor according to the invention may comprise the light source adapted to the emission of the analysis beam 111.

According to an alternative not represented, the elementary waveguides may have a rectangular parallelepiped shape. The distribution pitch of the elementary waveguides 121 being reduced, preferably less than 2 μm, the optical path of the guided light in the microresonator 120 may be assimilated with a circular path.

Advantageous rules for dimensioning the optical device according to the invention are detailed hereafter. Reference will be made to FIG. 1A to illustrate the quantities mentioned.

The microresonator, here ring shaped, advantageously has an outer radius less than or equal to 10 μm, in particular less than or equal to 5 μm.

Preferably, all the elementary waveguides have the same shape and the same dimensions. The shape of an elementary waveguide 121 is here a portion of a right cylinder with annular base, this portion being delimited by two planes 124 receiving the generatrix of the cylinder and together defining an angle α.

Each elementary waveguide 121 is characterised by a height, a width w and a length l (here l is a curvilinear length, measured at the centre of the elementary waveguide).

The different elementary waveguides 121 are distributed in a periodic manner one after the other, according to a regular pitch P, designated distribution pitch.

Here, the pitch P designates a curvilinear length, corresponding to the curvilinear length of an elementary waveguide 121 and of a free space 122. It is in other words the curvilinear length of a portion of the optical path 123, followed by the light at the centre of an elementary waveguide 121 and in the adjacent free space 122.

In order that the structure made of independent elementary waveguides does not affect the guided light beam in the microresonator, the pitch P is less than the central wavelength of said light beam.

At this scale, the light is only sensitive to an average refractive index between the index of the elementary waveguides 121 and the index in the free spaces 122, and is not diffracted. In other words, the core of the microresonator 120 behaves like a material of average refractive index:

$$n_{moy} = \sqrt{\frac{1}{P}n_h^2 + \frac{P-l}{P}n_b^2} \tag{2}$$

with:

l the curvilinear length of an elementary waveguide;

P the distribution pitch of the elementary waveguides;

$n_h$ the average refractive index in an elementary waveguide; and $n_b$ the average refractive index between two elementary waveguides, that is to say the average refractive index of the medium surrounding the elementary waveguides (this medium being able to include an ancillary moveable element as described above).

The average refractive index $n_{moy}$ constitutes an equivalent optical index of the microresonator according to the invention.

Preferably, the pitch P verifies in particular:

$$P < \frac{\lambda}{2n_{moy}} \tag{3}$$

with:

λ the central wavelength of the light beam which propagates in the microresonator, or in other words a resonance wavelength of the microresonator, or in other words the exploited resonance wavelength of the microresonator.

This advantageously even gives:

$$P < \frac{\lambda}{2n_h} \tag{4}$$

with:

$n_h$ the average refractive index in an elementary waveguide. Here, the elementary waveguides are constituted of a single and same material, thus $n_h$ is the refractive index of the elementary waveguides.

In practice, the distribution pitch P is advantageously less than 3 μm, and even less than 2 μm, or even 1 μm.

According to the invention, the microresonator 120 has a guided mode of effective index substantially equal to the effective index of a guided mode of the injection and extraction waveguide 110, preferably exactly equal. Substantially equal is taken to mean equal within more or less 1%, or even within more or less 5% or even within more or less 10%.

As a reminder, the effective index of a mode, notably the effective index of a guided mode of a waveguide, is defined in the following manner:

$$N_{eff} = \beta * \frac{\lambda}{2\pi} \quad (5)$$

with:

$N_{eff}$ the effective index of the considered mode;

λ the wavelength of the light beam propagating in the waveguide; and

β the phase constant of the waveguide.

The phase constant β depends on the wavelength and the mode of the light beam propagating in the waveguide, as well as the properties of said waveguide (in particular refractive indices and geometry).

The phase constant β is defined by: $A(z)=A(0)\exp(\gamma z)$, where z is an abscissa along a propagation path in the waveguide, A(z) is the complex amplitude as a function of z of a light beam propagating in the waveguide, and β is the imaginary part of γ.

It may sometimes be considered that the effective index designates the average optical index of the medium such as it is "seen" by a mode of the light beam propagating in the waveguide.

Preferably, the guided mode in the microresonator, respectively in the injection and extraction waveguide, is a zero order mode.

The injection and extraction waveguide 110 being formed of a single piece, and the microresonator 120 being formed segmented, the above condition on the effective indices of the guided modes advantageously results in a condition on the respective widths of the injection and extraction waveguide 110 and the elementary waveguides 121.

Advantageously, the following relationship applies:

$$w>W \quad (6)$$

with:

w the width of an elementary waveguide 121, measured in a plane orthogonal to the optical path 123 travelled by the light in the microresonator 120; and W the width of the injection and extraction waveguide 110, measured in a plane orthogonal to the optical path travelled by the light in the injection and extraction waveguide 110.

In practice, each elementary waveguide 121 preferably has a rectangular section of height $h_1$ and of width w, in planes orthogonal to the optical path 123 travelled by the light in the microresonator 120. In the same way, the injection and extraction waveguide 110 advantageously has a rectangular section of height $h_1=h_2$ and of width W, in planes orthogonal to the optical path travelled by the light in the injection and extraction waveguide 110.

Equation (6) is notably verified when the injection and extraction waveguide 110 is constituted of the same material as the elementary waveguides 121, and thus has the same refractive index.

The widths w and W making it possible to meet the above condition on the effective indices of the guided modes may be calculated with precision using electromagnetic simulation tools known to those skilled in the art. These simulation tools may be used to adjust the different parameters of the optical device according to the invention, in such a way as to meet said condition. These parameters are notably geometric parameters (distribution pitch P, curvilinear length l of an elementary waveguide), and the refractive index values (refractive indices of the injection and extraction waveguide and refractive index of the elementary waveguides).

In particular, it is possible to determine an optimal value of the ratio between the widths w and W.

The ratio of the width w divided by the width W is substantially equal to 2, advantageously comprised between 1.9 and 2.1, and even between 1.8 and 2.2.

Preferably, the ratio between the curvilinear length l of an elementary waveguide and the distribution pitch P is substantially equal to 0.5. In particular, this ratio is advantageously comprised between 0.4 and 0.6, or even between 0.45 and 0.55, or even exactly equal to 0.5.

In other words, the free spaces have around the same curvilinear length as the elementary waveguides, which corresponds to the best technological compromise since neither the elementary waveguides nor the free spaces have to have too reduced dimensions.

Preferably, there is both a ratio of around 0.5 between the curvilinear length l and the pitch P, and a ratio of the width w divided by the width W substantially equal to 2.

Figure 5:
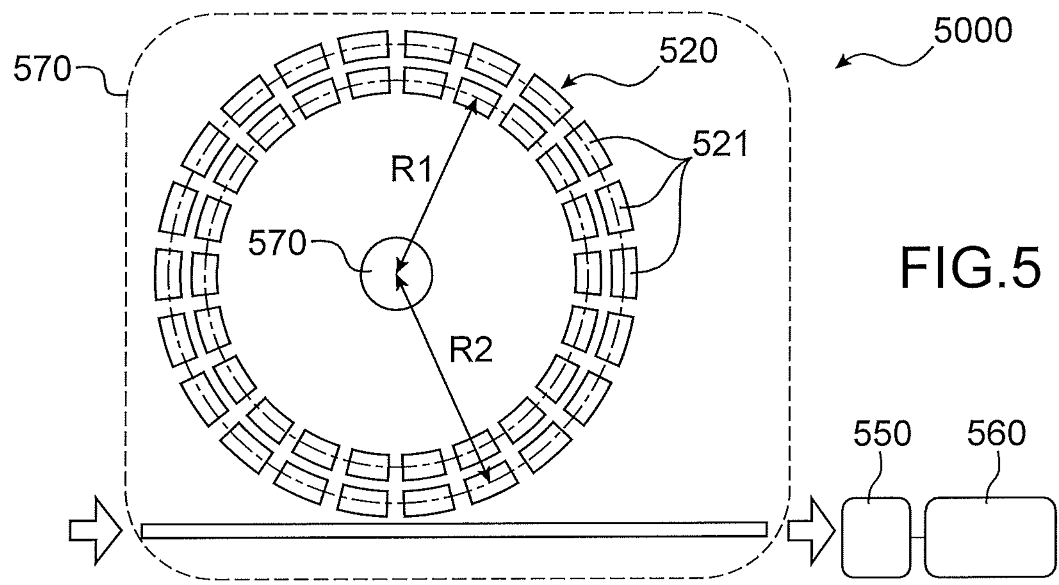
FIG. 5 illustrates in a schematic manner a second embodiment of an optical sensor according to the invention.

FIG. 5 illustrates in a schematic manner a second embodiment of an optical device 500 and an optical sensor 5000 according to the invention.

This second embodiment will only be described for its differences relative to the first embodiment described above.

Here, the microresonator 520 is laid out suspended above a substrate, bearing on a central pillar, or pedestal, 570. In other words, the bearing points of the elementary waveguides on the substrate are situated under the pedestal 570. Put yet another way, the elementary waveguides are bearing on the substrate through a lever arm.

Here, the optical device 500 does not comprise an ancillary moveable element.

The displacement detected by means of the invention is then a displacement of the elementary waveguides relative to each other.

The suspended layout frees in particular a radial contraction and extension movement of the microresonator 520, corresponding to respiration modes of the microresonator.

For illustration purposes, in FIG. 5 are represented simultaneously the microresonator 520 in a position of radial contraction (radius R1 of the microresonator), and in a position of radial extension (radius R2>R1 of the microresonator).

As in the prior art, the radial contraction and extension movement modifies the curvilinear length L of the optical path of a light beam making a turn in the microresonator, which modifies the resonance wavelengths λ of the microresonator since these two quantities are linked by:

$$\lambda = \frac{N_{eff} L}{m} \quad (7)$$

with:

$N_{eff}$ the effective index of the guided mode in the microresonator; and m an integer greater than or equal to one (see also equation (1)).

Said contraction and extension movement also modifies the distance between the microresonator and the injection and extraction waveguide, and thus the rate of optical coupling between these two elements. It also modifies the confinement of the light in the microresonator.

Moreover, due to the fact that the microresonator 520 is composed of a plurality of elementary waveguides 521, this movement also results in a coming closer then moving away of the elementary waveguides with respect to each other (without significant change of dimension for the elementary waveguides).

The ratio between the length l of an elementary waveguide (constant) and the distribution pitch P of said waveguides (modified) is thus modified.

This results in a variation in the average refractive index $n_{moy}$ of the microresonator (see equation (2)), and thus in the effective index $N_{eff}$ of the guided mode in the microresonator.

This variation in the effective index $N_{eff}$ also contributes to modifying the resonance wavelengths of the microresonator. The variation in resonance length, linked to the radial contraction and extension movement, is thus increased.

The variation in resonance wavelength is detected by the analysis device 560, which can deduce therefrom an amplitude of radial contraction and extension of the microresonator.

Figure 6A:
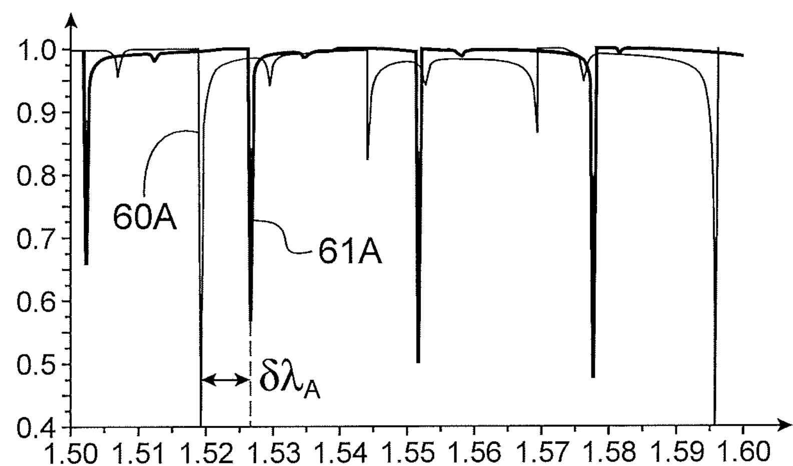
FIGS. 6A and 6B illustrate a comparison of the transmission spectrum variation obtained by means of a sensor according to the prior art, and by means of a sensor according to the invention.
Figure 6B:
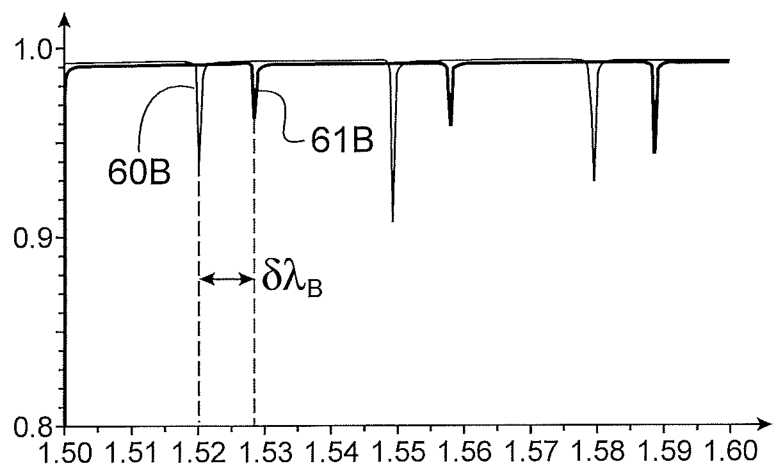

FIGS. 6A and 6B illustrate a comparison of the transmission spectrum variation obtained by means of a sensor according to the prior art (FIG. 6A), and by means of a sensor according to the invention (FIG. 6B).

In the two figures, the x-axis is a wavelength, in μm. The y-axis is a rate of transmission from one end to the other of the injection and extraction waveguide.

In FIG. 6A, the spectra 60A and 61A each correspond to an analysis beam, less the losses in a microresonator according to the prior art.

The spectrum 60A is associated with a position of extension of said microresonator. The spectrum 61A is associated with a position of contraction of said microresonator. The corresponding variation in resonance wavelength, $\delta\lambda_A$, is 7.7 nm.

In FIG. 6B, the spectra 60B and 61B each correspond to an analysis beam, less the losses in a microresonator according to the invention.

The microresonator associated with FIG. 6B only differs from that associated with FIG. 6A in that it is constituted of several elementary waveguides spaced apart from each other. In both cases, the position of contraction of the microresonator corresponds to an average radius of 5.00 μm, and the position of extension corresponds to an average radius of 5.05 μm (the average radius being the average of the inner radius and the outer radius of the microresonator).

The spectrum 60B is associated with a position of extension of said microresonator. The spectrum 61B is associated with a position of contraction of said microresonator. The corresponding variation in resonance wavelength, $\delta\lambda_B$, is 9.1 nm, i.e. an improvement of 18% of the sensitivity to the respiration modes of the microresonator.

FIGS. 7A and 7B illustrate in a schematic manner a first alternative of suspended layout of the microresonator according to the invention, respectively in a top view in a horizontal plane, and in a sectional view in a vertical plane.

In FIG. 7A is represented the section plane BB', corresponding to the view of FIG. 7B. Here again, the width of the elementary waveguides is under dimensioned.

The microresonator 720 is laid out suspended above a substrate 772, bearing on a pedestal 770.

The pedestal 770 is centred on the geometric centre of the microresonator 720.

The pedestal 770 preferably has a cylinder shape, of which the base has a diameter D1 comprised between 0.25 and 0.75 times the average diameter D2 of the microresonator (average of the inner diameter and outer diameter), preferably between 0.25 and 0.5 times this diameter D2.

The pedestal is preferably, but in a non-limiting manner, a cylinder of revolution. It may also be a cylinder with non-circular base, for example with oval base. The diameter D1 is then the greatest width of the base of the cylinder.

The elementary waveguides 721 composing the microresonator are all mounted integral with a same support plate 771.

They extend here adjacent to said support plate 771, along a peripheral edge thereof.

In practice, the assembly constituted of the elementary waveguides 721 and of the support plate 771 may be formed by etching of a single layer of material, such that no interface exists physically between an elementary waveguide 721 and the support plate 771.

According to an alternative not represented, the elementary waveguides are situated on the top of the support plate 771.

The support plate 771 has a reduced thickness, at least three times less than the thickness of the elementary waveguides, or even at least ten times less, such that it does not influence the optical guiding in the microresonator.

It extends in a plane parallel to the plane of the microresonator.

Preferably, it does not project outside of a zone delimited by the elementary waveguides.

It here has a full disc shape.

In an alternative, it may have other shapes, for example a ring shape, suspended around the pedestal by means of internal arms.

FIGS. 8A and 8B illustrate a second alternative of suspended layout of the microresonator according to the invention, respectively in a top view in a horizontal plane, and in a sectional view in a vertical plane.

In FIG. 8A is represented the section plane CC', corresponding to the view of FIG. 8B. Here again, the width of the elementary waveguides is under dimensioned.

In FIG. 8A is represented a reduced number of elementary waveguides for the simple sake of legibility of the figures, without this prefiguring any limitation relative to this alternative.

According to this alternative, the elementary waveguides are maintained suspended around the pedestal 870 by means of arms which extend parallel to the plane of the microresonator. In particular, the upper faces of the arms extend in a plane parallel to the plane of the microresonator.

The arms here include so-called peripheral arms, 875, which each extend between an elementary waveguide 821 and the neighbouring elementary waveguide, and so-called internal arms, 876, which each extend between an elementary waveguide 821 and the pedestal 870.

Here, the arms, in particular the peripheral arms, 875, each have a width LB much less than that of the elementary waveguides, for example at least 3 times less, and even at least 4 times or 5 times less.

In the example represented in FIG. 8A, all the elementary waveguides 821 are connected two by two by peripheral arms 875, and four internal arms 876 extend in a cross and join each other above the pedestal 870.

Here, the arms 875 and 876 are formed with the elementary waveguides in a same layer, and have the same thickness $h_1$ as the latter (see FIG. 8B).

FIGS. 9A to 9D illustrate different alternatives of a microresonator in a third embodiment of an optical device and an optical sensor according to the invention.

According to this third embodiment, the microresonator is laid out suspended above the pedestal, thanks to a support plate of the type of that described with reference to FIGS. 7A and 7B.

For the sake of clarity, FIGS. 9A to 9D only represent the microresonator, in a top view.

According to this third embodiment, the support plate is cut by trenches 925, or grooves, or slots which extend in its thickness.

Each trench 925 extends from an outer edge of the support plate up to a central region of the plate, and passes between two neighbouring elementary waveguides 921.

Here, the trenches each extend up to the pedestal.

Preferably, each trench 925 extends through the support plate over its entire thickness, forming a through opening in said plate.

Each trench 925 here extends along a radius of the ring microresonator.

In FIG. 9A, the support plate 971A comprises two trenches 925. These two trenches delimit laterally, on the support plate 971, a so-called isolated zone 9711A.

The isolated zone 9711A here receives a single elementary waveguide 921, called isolated waveguide, of which the movement relative to the other elementary waveguides is free.

In particular, the isolated waveguide can move horizontally in the plane of the microresonator 920A, according to a rotational movement around an axis parallel to (Oz).

It can also move vertically, passing above then below the plane of the microresonator, according to a rotational movement around an axis situated in the plane (xOy)

It can also move according to a rotational movement around the median axis of the isolated zone 9711A, this axis also being situated in the plane (xOy).

Each of these rotations results in an increase in losses at the resonance wavelengths of the microresonator, or in a shift of the resonance wavelength, the guiding condition even being able to be lost when the displacement of the isolated waveguide no longer makes it possible to meet the condition on the pitch P given in equation (3).

This increase in losses is detected by the analysis device, which can deduce therefrom an amplitude of the movement of the isolated waveguide.

In this way is produced a microresonator, and thus an optical device and sensor according to the invention, sensitive to a greater variety of external loads in comparison with the prior art.

The microresonator 920B of FIG. 9B only differs from that of FIG. 9A in that the isolated zone 9711B receives several neighbouring elementary waveguides 921.

The microresonator 920C of FIG. 9C only differs from that of 9A in that the support plate 971C comprises two isolated zones 9711C, each being delimited laterally by a pair of two trenches.

Each isolated zone 9711C here receives a single elementary waveguide.

The two pairs of trenches are laid out here symmetrical to each other, according to a planar symmetry relative to a plane orthogonal to the plane of the microresonator.

The microresonator 920D of FIG. 9D only differs from that of FIG. 9A in that the support plate 971D comprises a plurality of trenches defining a plurality of isolated zones 9711D. The isolated zones 9711D are symmetrical two by two, according to planar symmetries relative to a respective plane, orthogonal to the plane of the microresonator 920D.

Each isolated zone 9711D here receives several elementary waveguides.

Numerous other alternatives may be implemented without going beyond the scope of the invention, comprising more or less trenches, having or not symmetries, etc.

The distribution of the trenches makes it possible to favour one or the other movement of the elementary waveguides.

Numerous other alternatives may be implemented, for cutting the support plate in such a way as to isolate different elementary waveguides, neighbouring or not.

It is also possible to free the movement of one or more elementary waveguides, in a suspended layout as described with reference to FIGS. 8A and 8B, for example by eliminating some peripheral arms.

A particularly advantageous embodiment of an optical sensor according to the invention is described hereafter. According to this embodiment, not represented, the microresonator is laid out suspended above the pedestal, with a plurality of elementary waveguides of which the movement is free in such a way that they can move vertically by passing above or below then in the plane of the microresonator, according to a rotational movement around an axis situated in the plane (xOy). The elementary waveguides of which the movement is thereby free are distributed in a periodic manner along the microresonator. They are connected to control means, capable of moving them to place them alternately in the plane of the microresonator or outside of the plane of the microresonator (above or below). Said control means thereby carry out a switching of the microresonator between:

a so-called operating mode, in which all the elementary waveguides are laid out coplanar in a same horizontal plane PH1, and distributed in said plane according to a distribution pitch $P_1$ by verifying the equation (3)

$$P_1 < \frac{\lambda}{2n_{moy\_1}};$$

and a so-called extinction mode, in which some elementary waveguides extend outside of the plane PH1, and in which the elementary waveguides remaining in the plane PH1 are distributed according to a distribution pitch $P_2$ by verifying the equation $$P_2 < \frac{\lambda}{2n_{moy\_2}}.$$

$n_{moy\_1}$ designates the average refractive index of the core of the microresonator, in the operating mode.

$n_{moy\_2}$ designates the average refractive index of the core of the structure formed by the elementary waveguides remaining in the plane of the microresonator, in the extinction mode.

λ designates the wavelength of the light beam propagating in the micro-resonator in the operating mode, or exploited resonance wavelength.

The operating mode corresponds to the normal operating conditions as described above.

In the extinction mode, the elementary waveguides remaining in the plane PH1 do not realise any optical guiding of the signal arriving from the injection waveguide, respectively injection and extraction waveguide. In other words, they form an open switch. It is noted that they meet in fact the condition of a Bragg mirror.

A switching between three modes could be implemented, where the third mode verifies $$P_3 < \frac{\lambda}{2n_{moy\_3}},$$

with $P_3$ use distribution pitch of the elementary waveguides situated in the plane of the microresonator in this third mode, and $n_{moy\_3}$ the average refractive index of the core of the structure formed by the elementary waveguides then situated in the plane of the microresonator. This third mode corresponds to a guiding with much losses.

FIGS. 10A and 10B illustrate two alternatives of a coupling zone of an injection and extraction waveguide according to the invention.

Said coupling zone is located near to the microresonator, at the spot where evanescent coupling between the injection and extraction waveguide and the microresonator takes place. In order to favour this coupling, it is possible to improve the phase tuning between the respective modes propagated in the injection and extraction waveguide and in the microresonator.

The phase tuning is respected when the respective effective indices of the injection and extraction waveguide and of the microresonator are identical.

Two solutions for obtaining this equality of effective indices are described below.

In FIG. 10A, the width of the injection and extraction waveguide 1010A decreases progressively then again increases, as it comes closer to, then moves away from, the microresonator 1020.

The injection and extraction waveguide 1010A then comprises a zone 10101 of reduced width, adjacent to the microresonator, two adiabatic coupling zones 10102 (tapers), of decreasing, respectively increasing, width and two zones 10103 of greater width, on either side of the zone 10101.

In an alternative, it is possible to favour coupling by means of an injection and extraction waveguide 1010B of which the shape varies progressively up to coming close to the segmented shape of the microresonator (see FIG. 10B).

The injection and extraction waveguide 1010B is segmented, in a region adjacent to the microresonator. The transition from straight guide to segmented guide takes place by means of a central zone 10104 (taper), full, of which the width decreases in coming closer to the microresonator.

The shape of the injection and extraction waveguide 1010B is delimited by an outer envelope of which the width increases on coming closer to the microresonator.

Inside this outer envelope, segments 10105 are distributed according to a periodic pitch on either side of the central zone 10104. The segments 10105 each extend from the central zone 10104 up to the outer envelope. At the level of the microresonator, the injection and extraction waveguide 1010B comprises only segments 10105, which each extend from one edge to the other of the outer envelope.

The distribution pitch of the segments 10105 is substantially equal to the distribution pitch of the elementary waveguides of the microresonator.

The different embodiments described above may be combined together. For example, the suspended layout of the microresonator and the detection of a displacement of an ancillary moveable element may be combined.

These embodiments include each time a microresonator coupled to a mechanical oscillator, or itself forming a mechanical oscillator. In the first case, the microresonator is fixed, and an ancillary element moves in its near field, the ancillary element being able to be an injection and/or extraction waveguide.

The invention is not limited to the examples described above, and numerous alternatives could be made without going beyond the scope of the invention.

For example, the elementary waveguides may not be laid out according to a ring shape, but according to another closed loop shape, for example a triangle with rounded angles, a rectangle with rounded angles, a so-called race-track shape (formed of two half-circles joined by two parallel segments), etc.

The optical device according to the invention may also include a plurality of microresonators according to the invention, optically coupled together by evanescent coupling.

The optical sensor according to the invention makes it possible to detect and measure nanometric displacements (for example less than 20 nm), within the microresonator or in its near field.

These nanometric displacements may be brought about by a load such as an acceleration of the coordinate system receiving the optical device according to the invention, a rotation of this coordinate system, a displacement of a particle of non-zero mass (for example a particle falling on a nanobeam as described above), a displacement of photon, a displacement of atom, etc.

The analysis device may be laid out to convert the measurement of such a displacement into an acceleration value, or angular speed value, or mass value, or electromagnetic radiation value, or displacement of atom value, etc., to form thereby a sensor of type accelerometer, or gyrometer, or sensor sensitive to mass such as a mass spectrometer, or radiation pressure sensor, or sensor for a source of photons, etc.

The invention does not relate to the optical device with microresonator as such.

Figure 11:
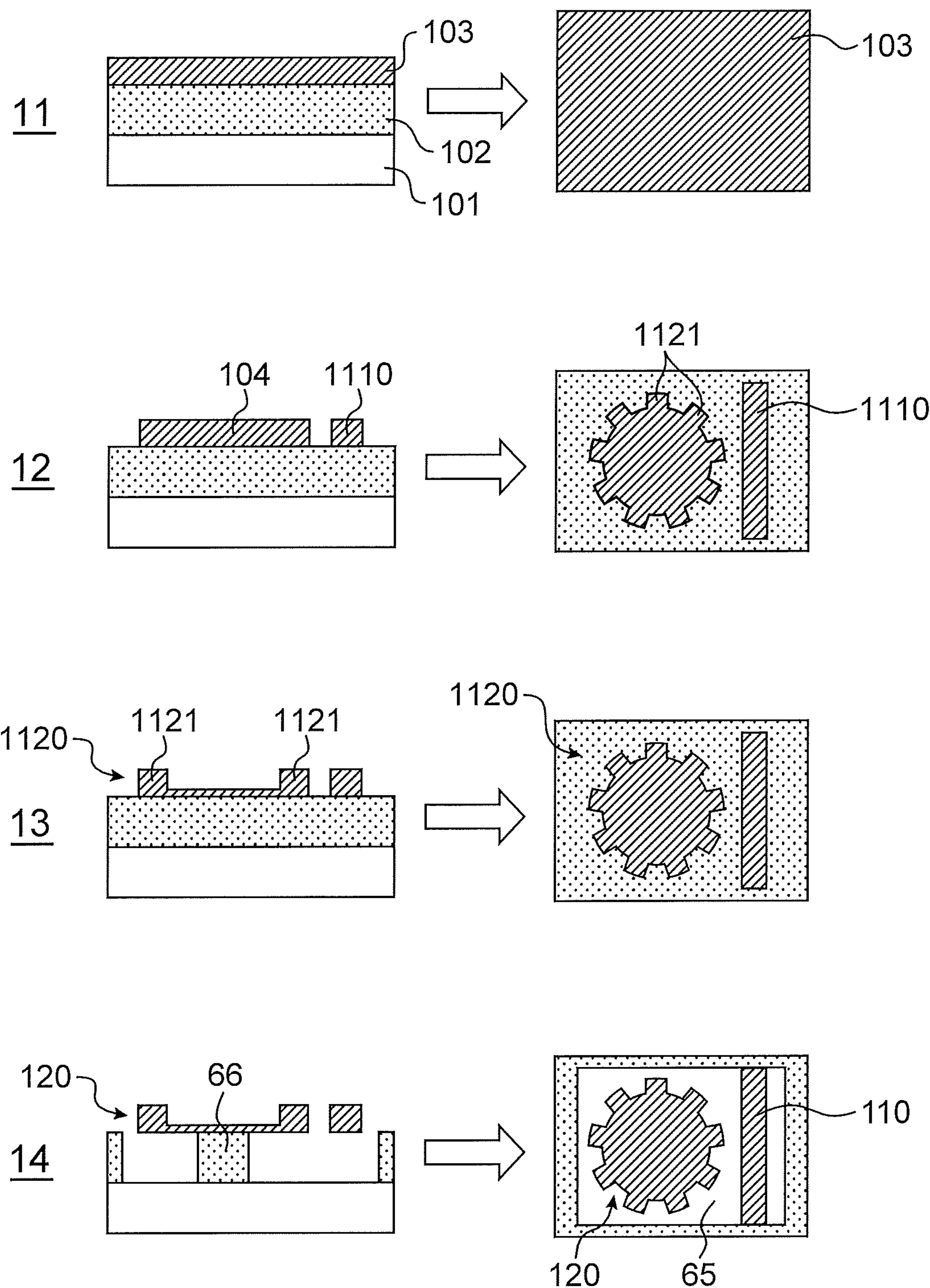
FIG. 11 illustrates in a schematic manner a method for manufacturing an optical device according to the invention.

FIG. 11 illustrates in a schematic manner an example of a method for manufacturing an optical device according to the invention.

On the left, the device during manufacture is represented according to a sectional view.

On the right, the device during manufacture is represented according to a top view.

The method of manufacture uses a so-called SOI (Silicon On Insulator) stack, constituted of the following three superimposed layers: a substrate 101 (for example made of silicon), an intermediate layer 102 made of silicon dioxide, and an upper layer 103 made of silicon (starting point 11).

During a first step 12, the upper layer 103 made of silicon is etched over its entire thickness, here to form the injection and extraction waveguide 1110 and a notched disc 104 made of silicon. Each notch of the notched disc 104 corresponds to an elementary waveguide 1121 of the microresonator.

The method according to the invention next includes a step 13 of etching the disc 104, only over a part of its thickness. During this step 13, the disc 104 is etched in a central region thereof, to form the microresonator 1120.

The etching conserves a low thickness of the central region of the disc 104, which makes it possible to ensure the mechanical strength of the microresonator 1120, and in particular to maintain integral with each other the elementary waveguides 1121 (see support plate described with reference to FIGS. 7A and 7B).

According to an alternative not represented, at step 12, a full disc (and not a notched disc) is etched. At step 13, the full disc is etched over a part of its thickness, in a central region and in annular regions thereof. The elementary waveguides are then arranged on a residual disc of low thickness.

Finally, in a step 14, the intermediate layer 102 is etched over its entire thickness to form a cavity 105 under the microresonator 1120 and the injection and extraction waveguide 1110. The etching conserves, under the microresonator 1120, a pedestal 1170 to maintain the microresonator 1120 suspended above the substrate 101. The pedestal 1170 is approximately centred on the centre of the microresonator 1120.

The intermediate layer subsisting around the cavity 105 serves notably to mechanically maintain the injection and extraction waveguide 1110, in suspension above the substrate 101.

The etching is here a wet etching over time.

Each of the etchings preferably uses an etching mask.

An ancillary moveable element may, like the injection and extraction waveguide, be etched in the upper layer 103 made of silicon.

In an alternative, the ancillary moveable element may be constituted of a material different to that of the waveguides. It is for example a carbon nanotube.

The invention claimed is:

1. An optical sensor comprising:

an optical device comprising a waveguide microresonator, laid out to guide a light beam along a closed loop optical path, and an injection and extraction waveguide, or an injection waveguide and an extraction waveguide, optically coupled to the microresonator for the injection and the extraction of said light beam;

a photodetector, wherein the photodetector is arranged at an output of the injection and extraction waveguide, or at an output of the extraction waveguide; and a processor, receiving as input a signal supplied by the photodetector, configured to compare said signal with reference data, and to deduce therefrom information relative to a displacement within the optical device;

wherein the microresonator is constituted of a plurality of elementary waveguides spaced apart from each other, and arranged one after the other according to a loop shaped layout.

2. The optical sensor according to claim 1, comprising a moveable nanobeam, adapted to move relative to the microresonator so as to traverse partially or totally a free space between two neighbouring elementary waveguides.

3. The optical sensor according to claim 1, wherein the elementary waveguides of the microresonator are suspended above a substrate, and around a pedestal.

4. The optical sensor according to claim 3, wherein the pedestal has a cylinder shape, a base of the cylinder having a diameter comprised between 0.25 and 0.75 times a diameter of the microresonator.

5. The optical sensor according to claim 3, wherein the elementary waveguides of the microresonator are mounted integral with a support plate, the support plate bearing on the pedestal.

6. The optical sensor according to claim 5, wherein the support plate has one or more trenches, each of said trenches extending from a peripheral region of the support plate, situated between two neighbouring elementary waveguides, up to a central region of the support plate.

7. The optical sensor according to claim 6, wherein the support plate has at least one pair of trenches, each pair delimiting on the support plate an isolated zone receiving one or more elementary waveguides.

8. The optical sensor according to claim 7, wherein the support plate has a single pair of trenches.

9. The optical sensor according to claim 7, wherein the support plate has two pairs of trenches, laid out symmetrically with respect to each other.

10. The optical sensor according to claim 6, wherein the support plate has a plurality of trenches together delimiting a plurality of isolated zones symmetrical two by two.

11. The optical sensor according to claim 6, wherein the support plate comprises a plurality of trenches distributed in a periodic manner on the support plate, so as to isolate a plurality of moveable elementary waveguides, and the optical sensor further comprises control means, for controlling the displacement of the moveable elementary waveguides in such a way as to position them alternately:

in a plane of the microresonator, in a position in which the elementary waveguides of the microresonator are distributed together according to a distribution pitch (P) less than $$\frac{\lambda}{2n_{moy\_1}},$$

with λ an exploited resonance wavelength of the microresonator and $n_{moy\_1}$ an average refractive index of the microresonator comprising all the elementary waveguides; and outside of the plane of the microresonator, in a position in which the elementary waveguides remaining in the plane of the microresonator are distributed together according to a distribution pitch equal to $$\frac{\lambda}{2n_{moy\_2}},$$

with λ the exploited resonance wavelength of the microresonator and $n_{moy\_2}$ a refractive index of a structure formed by the elementary waveguides remaining in the plane of the microresonator.

12. The optical sensor according to claim 3, wherein the elementary waveguides are suspended around the pedestal by arms which extend in a plane parallel to the plane of the microresonator.

13. The optical sensor according to claim 1, wherein the elementary waveguides are hearing on a substrate, without a lever arm.

14. The optical sensor according to claim 1, wherein the elementary waveguides of the microresonator are distributed in a periodic manner one after the other, according to a distribution pitch.

15. The optical sensor according to claim 14, wherein the distribution pitch (P) is less than:

$$\frac{\lambda}{2n_h}$$

with λ a resonance wavelength of the microresonator; and $n_h$ an average refractive index of the elementary waveguides.

* * * * *